United States Patent
Tsao

(10) Patent No.: US 9,477,293 B2
(45) Date of Patent: Oct. 25, 2016

(54) EMBEDDED CONTROLLER FOR POWER-SAVING AND METHOD THEREOF

(71) Applicant: Wistron Corporation, New Taipei (TW)

(72) Inventor: Wen-Chun Tsao, New Taipei (TW)

(73) Assignee: Wistron Corporation, New Taipei (TW)

( * ) Notice: Subject to any disclaimer, the term of this patent is extended or adjusted under 35 U.S.C. 154(b) by 186 days.

(21) Appl. No.: 14/180,303

(22) Filed: Feb. 13, 2014

(65) Prior Publication Data

US 2014/0359326 A1 Dec. 4, 2014

(30) Foreign Application Priority Data

May 29, 2013 (TW) .............................. 102118953 A

(51) Int. Cl.
*G06F 1/00* (2006.01)
*G06F 1/32* (2006.01)
*G06F 9/48* (2006.01)

(52) U.S. Cl.
CPC ........... *G06F 1/3243* (2013.01); *G06F 9/4893* (2013.01); *Y02B 60/1239* (2013.01); *Y02B 60/144* (2013.01); *Y02B 60/32* (2013.01)

(58) Field of Classification Search
CPC ...... G06F 1/3243; G06F 9/48; G06F 1/3203; G06F 1/3206; G06F 1/329
See application file for complete search history.

(56) References Cited

U.S. PATENT DOCUMENTS 5,189,647 A * 2/1993 Suzuki .................. G06F 1/3203 368/10
5,577,235 A * 11/1996 Mitra .................. G06F 15/7814 713/600
6,232,808 B1 * 5/2001 Cave .......................... G06F 1/04 327/172

(Continued)

FOREIGN PATENT DOCUMENTS

| CN | 101802753 | 10/2012 |
|---|---|---|
| TW | 200830094 | 7/2008 |

(Continued)

OTHER PUBLICATIONS

Shimpi, Anand Lal. "Intel's Haswell Architecture Analyzed: Building a New PC and a New Intel." Anandtech. Anandtech, Oct. 5, 2012. Web. Oct. 21, 2015. <http://www.anandtech.com/show/6355/intels-haswell-architecture/3>.*

(Continued)

*Primary Examiner* — Mohammed Rehman
*Assistant Examiner* — Brian J Corcoran
(74) *Attorney, Agent, or Firm* — Jianq Chyun IP Office

(57) ABSTRACT

An embedded controller for power-saving and a method thereof are provided. The embedded controller is used for executing a plurality of tasks and includes a timer module and a control unit. The timer module includes a plurality of timers, and each of timers is corresponding to one of the tasks respectively. The control unit is coupled to the timer module and respectively sets a wake-up period according to each task. When the wake-up period of each timer is expired, each timer respectively generates a wake-up signal to the control unit. The control unit controls the embedded controller to transfer to an active model from an idle model according to the wake-up signals respectively. After executing the tasks corresponding to the wake-up signals respectively, the control unit controls the embedded controller to transfer to the idle model from the active model.

16 Claims, 4 Drawing Sheets

(56) References Cited

U.S. PATENT DOCUMENTS

| | | | |
|---|---|---|---|
| 8,020,025 B2* | 9/2011 | Hyatt | G06F 1/3203 713/320 |
| 8,112,646 B2 | 2/2012 | Tsai | |
| 8,504,753 B2* | 8/2013 | Danko | G06F 9/30076 710/262 |
| 9,128,703 B1* | 9/2015 | Lachwani | G06F 1/3203 |
| 2004/0078616 A1* | 4/2004 | Yamakawa | G06F 1/206 713/600 |
| 2010/0153765 A1* | 6/2010 | Stemen | G06F 1/3203 713/340 |
| 2011/0035613 A1* | 2/2011 | Rancurel | G06F 1/3203 713/323 |
| 2013/0080819 A1 | 3/2013 | Bowling et al. | |
| 2013/0290757 A1* | 10/2013 | Barlow | G06F 1/3287 713/323 |
| 2014/0089701 A1* | 3/2014 | Kato | G06F 9/4837 713/323 |

FOREIGN PATENT DOCUMENTS

| | | |
|---|---|---|
| TW | 201319935 | 5/2013 |
| WO | 2012088652 | 7/2012 |

OTHER PUBLICATIONS

Hewlett-Packard; Intel Corporation; Microsoft; Phoenix Technologies; Toshiba (Jun. 16, 2009). "Advanced Configuration and Power Interface Specification (Revision 4.0)" (PDF). acpi.info. Retrieved Jul. 6, 2015.*

"Office Action of Taiwan Counterpart Application" with partial English translation, issued on Jan. 28, 2015, p. 1-p. 12, in which the listed references were cited.

"Office Action of China Counterpart Application", issued on May 4, 2016, with English traslation thereof, p. 1-p. 16, in which the listed reference was cited.

* cited by examiner

EMBEDDED CONTROLLER FOR POWER-SAVING AND METHOD THEREOF

CROSS-REFERENCE TO RELATED APPLICATION

This application claims the priority benefit of Taiwan application serial no. 102118953, filed on May 29, 2013. The entirety of the above-mentioned patent application is hereby incorporated by reference herein and made a part of this specification.

BACKGROUND

1. Field of the Disclosure

The present disclosure is directed to a method for power-saving and more particularly, to a power-saving method applicable to an embedded controller.

2. Description of Related Art

Power management is an important function of a common desktop computer and a portable peripheral device (such as a notebook computer), which relies on power supplied by batteries. How to effectively reduce power usage of inactive equipments with respect to operating conditions of computer devices and peripheral equipments, so as to improve efficiency and extend lifetime of batteries is particularly critical to power management.

In order to maintain a common power management interface between operating systems and hardware, an advanced configuration and power interface (ACPI) standard has been developed to improve efficiency of power management based on interactions between the user and the operating system. When the operation system is aware that certain functions in the computer are currently inactive, the functions may be automatically terminated to reduce power consumption to save more power. In the ACPI standard, the embedded controller is configured to control battery power of the computer system and operation states of a plurality of peripheral devices in the computer system to achieve an effect of power-saving.

However, as for the power consumption of the embedded controller, the power consumed by the embedded controller is relatively low to the other elements in the computer system, which is not a factor of affecting the lifespan of the battery. Nevertheless, with the development of the technology, more and more techniques and methods for power saving have been progressive day by day, such that the power consumption of each element in the computer system has gradually lowered down. Meanwhile, with the development of portable electronic products, such as Ultrabook and tablet computers, which are more power-saving, the power consumption of the embedded controllers has become an important issue to be studied.

In a current embedded controller, each task has a different execution period so as to transfer to an active mode with high power consumption from an idle mode. However, the embedded controller transfers to the active mode with high power consumption from the idle mode merely by a timer using the shortest time period. For example, FIG. 1 is a schematic timing diagram illustrating the operation of a conventional embedded controller. In this case, it is assumed that the embedded controller has 5 tasks, wherein the first task has to be executed once per 10 milliseconds (ms), the second task has to be executed once per 20 ms, the third task has to be executed once per 30 ms, the fourth task has to be executed once per 50 ms, the fifth task has to be executed once per 100 ms, and the time required for the embedded controller to process each task is t.

As illustrated in FIG. 1, the embedded controller transfers to the active mode from the idle mode by the timer constantly using the shortest period of 10 ms so as to execute the first task. Then, the embedded controller checks whether each of the other tasks has to be executed. Namely, per 10 ms, the embedded controller requires taking 5t of time to stay in the active mode. Accordingly, the embedded controller requires staying in the active mode and taking time in examining the tasks that do not have to be processed, which result in unnecessary power consumption.

SUMMARY

Accordingly, the present disclosure provides an embedded controller for power-saving and a method thereof, such that the embedded controller may achieve an effect of saving power consumption by controlling a plurality of timers.

The present disclosure provides an embedded controller applicable to a computer system and configured to execute a plurality of tasks. The embedded controller includes a timer module and a control unit. The timer module includes a plurality of timers, and each of the timers respectively corresponds to one of the tasks. The control unit is coupled to the timer module and sets a wake-up period of each of the timers according to each of the tasks. When the wake-up period of each of the timers is expired, each of the timers respectively generates a wake-up signal to the control unit. The control unit controls the embedded controller to transfer to an active mode from an idle mode based on each received wake-up signals accordingly and controls the embedded controller to transfer back to the idle mode from the active mode after respectively executing the tasks respectively corresponding to the timers which generate the wake-up signals.

The present disclosure provides a method for power-saving, which is applicable to an embedded controller, includes steps as follows. The embedded controller configures a plurality of timers respectively corresponding to a plurality of tasks to be executed by the embedded controller and sets a wake-up period of each of the timers. When the wake-up period of each of the timers is expired, each of the timers generates a wake-up signal. When receiving the wake-up signal transmitted by each of the timers, an active mode is transferred to from an idle mode. The tasks corresponding to the timers which generate the wake-up signals are respectively executed. The idle mode is transferred to from the active mode when the tasks corresponding to the timers which generate the wake-up signals are all completed.

The present disclosure provides a method for power-saving, which is applicable to a portable electronic device, includes steps as follows. First, a plurality of timers corresponding to a plurality of tasks to be executed is configured, and a wake-up period of each of the timers is set. When the wake-up period of each of the timers is expired, a wake-up signal is respectively generated to control an embedded controller of the portable electronic device to transfer to an active mode from an idle mode. Then, after the embedded controller executes the tasks to be executed corresponding to the timers which generate the wake-up signals, the embedded controller is controlled to transfer back to the idle mode from the active mode.

To sum up, in the embedded controller and the method for power-saving of the present disclosure, a plurality of timers corresponding to a plurality of tasks to be executed is configured, and when the wake-up period of each of the timers is expired, each of the timers generates the wake-up signal so as to control the embedded controller to transfer to the active mode from the idle mode. By doing so, the time for the embedded controller being in the active mode is shortened, such that power consumption of the embedded controller is reduced to achieve power-saving.

In order to make the aforementioned and other features and advantages of the present disclosure more comprehensible, several embodiments accompanied with figures are described in detail below.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF EMBODIMENTS

According to the ACPI standard, power states include S0 state through S5 state. Therein, the S0 state is a typical operation state, while the S1 through S5 states provide different levels of power-saving states for a computer system. For instance, in order to prevent an operation system state stored in a memory from disappearing with the power off and to achieve a power-saving effect, in the S3 state, the power is merely supplied to the memory for maintaining the normal operation of the memory. Moreover, INTEL also sets up a new power-saving state, which is called the S0i3 power-saving state. In the S0i3 state, the power consumption of the entire computer system is about 110 milliwatts (mW), and it takes only 300 milliseconds (ms) to rapidly transfer to the operation state S0 from the S0i3 power-saving state. In an embodiment of the present disclosure, the power consumption of an embedded controller is considered based on a condition where the power consumption of each element of the computer system is already significantly reduced in the S0i3 state, and a plurality of timers is configured to transfer the state of the embedded controller to achieve an effect of power-saving. However, the present disclosure is not limited thereto. In order to make the present disclosure more comprehensible, embodiments are described below as examples showing that the disclosure can actually be realized.

Figure 2:
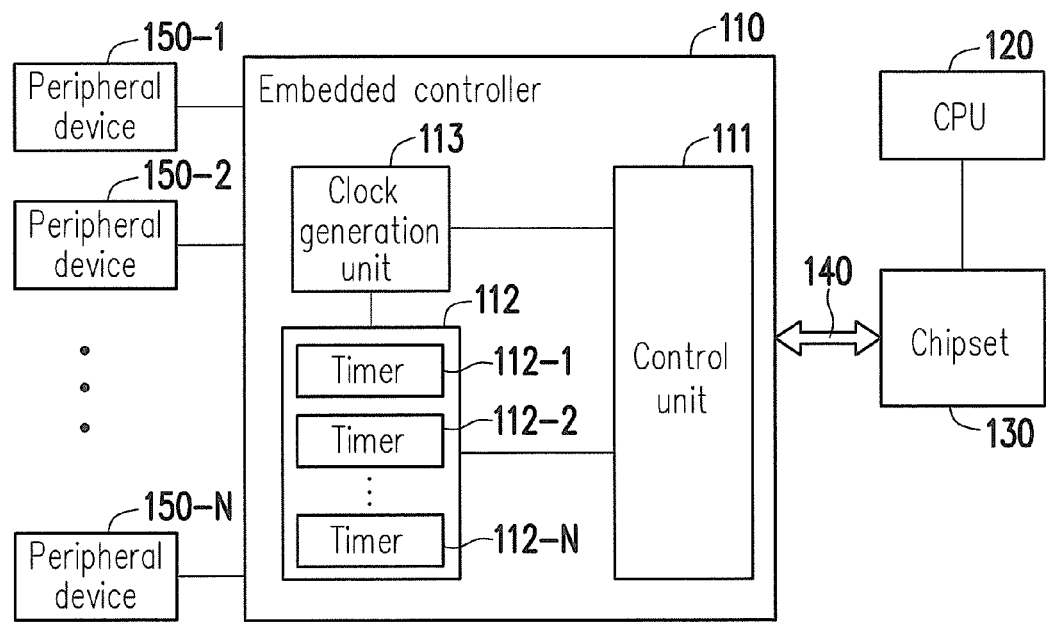
FIG. 2 is a block diagram illustrating a computer system according to an embodiment of the present disclosure.

FIG. 2 is a block diagram illustrating a computer system according to an embodiment of the present disclosure. With reference to FIG. 2, a computer system 10 of the present embodiment is, for example, a desktop computer, a notebook computer or a smart phone, of which the scope is not limited herein. The computer system 10 includes a central processing unit (CPU) 120, a chipset 130, a low pin count (LPC) bus 140, peripheral devices 150-1~150-N and an embedded controller 110. The embedded controller 110 is configured to control the peripheral devices 150-1~150-N of the computer system 10. For instance, the peripheral devices 150-1~150-N may include a fan or an input device, such as a touch panel or a keyboard (not shown), and the present disclosure is not limited thereto. On the other hand, the embedded controller 110 may also perform power management on the computer system 10.

In an embodiment of the present disclosure, the embedded controller 110 further includes a control unit 111, a timer module 112 and a clock generation unit 113. The clock generation unit 113 is coupled to a clock source and a timer module 112. The clock generation unit 113 receives a reference clock signal generated by the clock source to generate an operation clock signal, such that each unit of the embedded controller 110 may be normally operated. It is to be mentioned that the clock source may be constructed by a quartz oscillator (not shown) or a master device, such as the CPU 120 or the chipset 130, connected with the embedded controller 110. The clock generation unit 113 may simultaneously receives a reference clock signal generated by the quartz oscillator and a reference clock signal transmitted via the LPC bus 140 so as to generate the operation clock signal.

The timer module 112 of the embedded controller 110 includes a plurality of timers 112-1~112-N. The timers 112-1~112-N achieve a timing effect by using the operation clock signal generated by the clock generation unit 113. Typically, each of the timers 112-1~112-N may output a timing signal at a predetermined time or periodically by counting the operation clock signal having a constant frequency so as to achieve the timing effect. The timers 112-1~112-N may be implemented in a hardware form or a firmware/software form, and the present disclosure is not limited thereto. In addition, the present disclosure is not intent to limit the number of the peripheral devices and the timers, and thus, N is a positive integer.

The control unit 111 is coupled to the timer module 112 and configured to execute a plurality of tasks. The timers 112-1~112-N respectively correspond to the tasks, and the control unit 111 sets a wake-up period of each of the timers 112-1~112-N according to each of the tasks. To be detailed, for different tasks, the wake-up periods vary with the content of the tasks, and the control unit 111 sets the wake-up period of each of the timers 112-1~112-N according to each of the different tasks. In brief, one task has one wake-up period and corresponds to one timer.

Each of the timers 112-1~112-N determines whether the wake-up period thereof is expired according to the operation clock signal generated by the clock generation unit 113. When the wake-up period of each of the timers 112-1~112-N is expired, the timers 112-1~112-N generate wake-up signals to the control unit 111. The control unit 111 controls the embedded controller 110 to transfer to an active mode from an idle mode according to each received wake-up signal. After the embedded controller 110 enters the active state, the control unit 111 respectively executes the tasks corresponding to the timers 112-1~112-N which generate the wake-up signals. After completing all the tasks, the control unit 111 further controls the embedded controller 110 to transfer back to the idle mode from the active mode.

Moreover, it is to be mentioned that since the tasks respectively have different wake-up periods, the time when the control unit 111 receives the wake-up signal is also different, and as a result, the control unit 111 may be simultaneously receive a plurality of wake-up signals transmitted from the timers 112-1~112-N. For instance, the control unit 111 may receive a wake-up signal transmitted by the timer 112-1 at a certain time point and may receive wake-up signals transmitted by the timer 112-1 and the timer 112-2 at another time point. No matter how many wake-up signals the control unit 111 receives, the control unit 111 controls the embedded controller 110 to transfer to the active mode from the idle mode as long as receiving any wake-up signals.

After the embedded controller 110 transfers to the active mode, the control unit 111 sequentially executes the tasks respectively corresponding to the timers 112-1~112-N and controls the embedded controller 110 to transfer back to the idle mode from the active mode when all the tasks are completed. For instance, the control unit 111 may merely receive the wake-up signal transmitted by the timers 112-1 at a certain time and executes the task corresponding to the timer 112-1 after controlling the embedded controller 110 to transfer to the active mode. After completing the task corresponding to the timer 112-1, the control unit 111 controls the embedded controller 110 to transfer back to the idle mode from the active mode.

Moreover, the control unit 111 may also simultaneously receive the wake-up signals transmitted by the timer 112-1 and the timer 112-2 at another time point. Thus, after the embedded controller 110 transfers to the active mode, the control unit 111 starts to execute the tasks corresponding to the timer 112-1 and the timer 112-2 respectively. After completing the tasks corresponding to the timer 112-1 and the timer 112-2, the control unit 111 controls the embedded controller 110 to transfer back to the idle mode from the active mode. It is to be noticed that the present disclosure is not intent to limit the sequence for executing each of the tasks.

In another embodiment of the present disclosure, the embedded controller 110 is coupled to a plurality of peripheral devices 150-1~150-N. The tasks executed by the control unit 111 include controlling the peripheral devices 150-1~150-N and/or data accessing with the peripheral devices 150-1~150-N. The peripheral devices referred to herein may include, for example, a fan, a keyboard device, a touch panel or a display, but the present disclosure is not limited thereto. The timers 112-1~112-N respectively correspond to the peripheral devices 150-1~150-N. The control unit 111 of the embedded controller 110 sets the wake-up periods of the timers 112-1~112-N according to processing orders required for the peripheral devices 150-1~150-N, respectively.

It is to be mentioned again that in another embodiment of the present disclosure, when the computer system 10 is in the S0i3 power-saving state set up by INTEL, the embedded controller 110 may switch between the idle mode and the active mode according to the wake-up signals of the timers 112-1~112-N.

Figure 3:
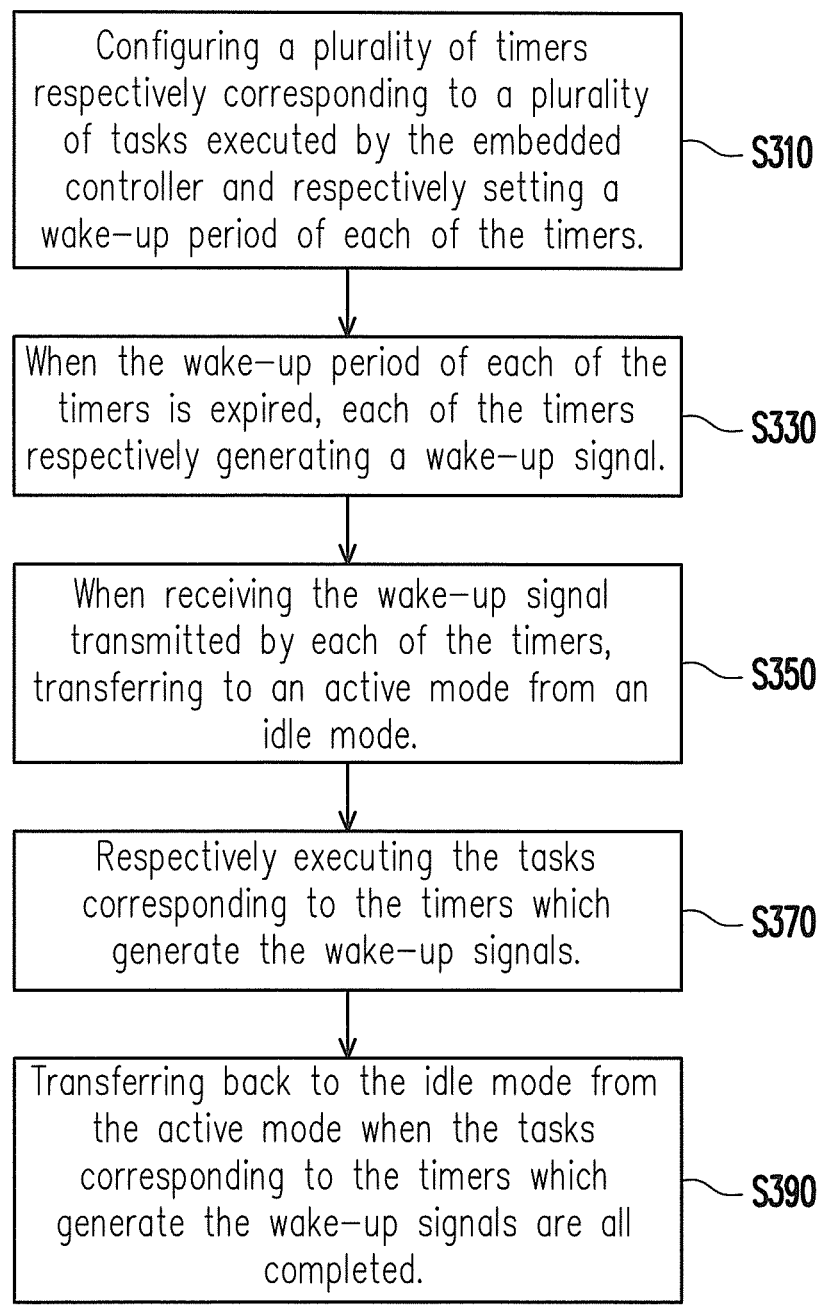
FIG. 3 is a flowchart illustrating a method for power-saving according to another embodiment of the present disclosure.

FIG. 3 is a flowchart illustrating a method for power-saving according to another embodiment of the present disclosure. The method of the present embodiment is also applicable to the computer system 10 illustrated in FIG. 2 and will be described with reference to FIG. 2 and FIG. 3 hereinafter.

First, in step S310, the control unit 111 configures the timers 112-1~112-N of the timer module 112 to respectively correspond to a plurality of tasks to be executed by the embedded controller 110 and respectively sets a wake-up period of each of the timers 112-1~112-N. For instance, the embedded controller 110 has 5 tasks Task1~Task5 to be executed. The tasks Task1~Task5 have different wake-up periods T1~T5 according to content of the tasks and also have the corresponding timers 112-1~112-5. The corresponding relationship among the tasks, the wake-up periods and the timers is shown in Table 1, but does not construct any limitations to the present disclosure.

TABLE 1

| Tasks | Task1 | Task2 | Task3 | Task4 | Task5 |
|---|---|---|---|---|---|
| Wake-up period | T1 | T2 | T3 | T4 | T5 |
| Timers | Timer 112-1 | Timer 112-2 | Timer 112-3 | Timer 112-4 | Timer 112-5 |

Then, in step S330, when the wake-up period of the timers 112-1~112-N are expired, the timers 112-1~112-N respectively generate wake-up signals to the control unit 111. In step S350, when receiving the wake-up signals transmitted by the timers 112-1~112-N, the control unit 111 controls the embedded controller 110 to transfer to the active mode from the idle mode accordingly. In step S370, the control unit 111 respectively executes the tasks corresponding to the timers 112-1~112-N which generate the wake-up signals. After the tasks are all completed, in step S390, the control unit 111 controls the embedded controller 110 to transfer back to the idle mode from the active mode.

In addition, in another embodiment of the present disclosure, the control unit 111 may further set the wake-up periods corresponding to the timers according to importance orders of the tasks. That is to say, for a task that is more important, the task may require a relatively high frequency for execution since the task content may be relatively urgent, such that a shorter wake-up period may be therefore set. Otherwise, for a task that is less important, a longer wake-up period may be set, and the task may be executed in a relatively low frequency.

Figure 4:
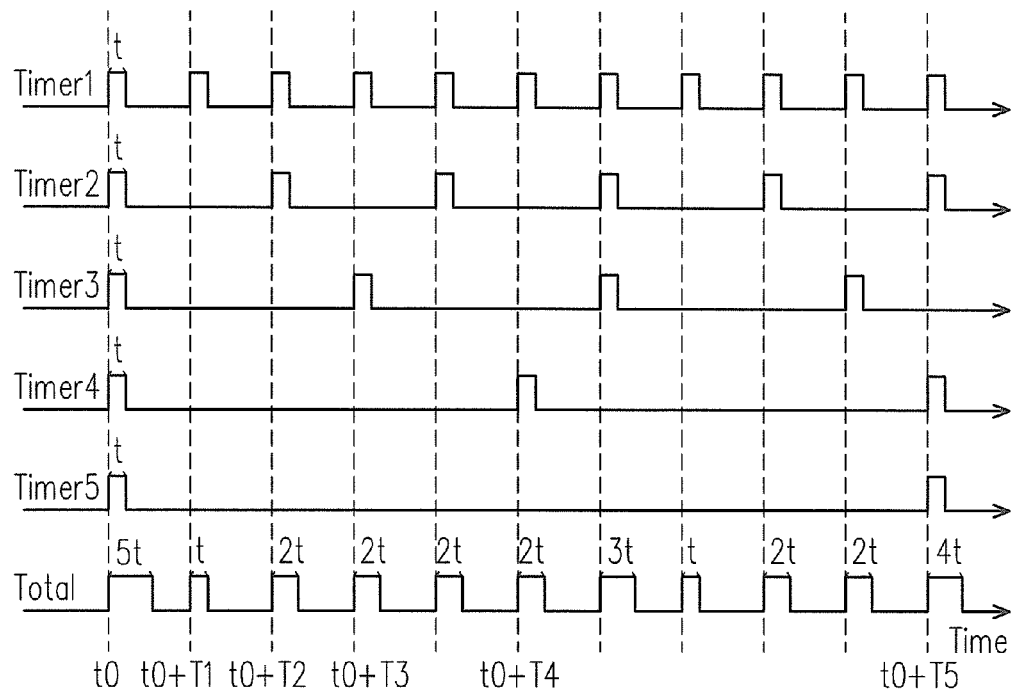
FIG. 4 is schematic timing diagram illustrating the operation an embedded controller according to yet another embodiment of the present disclosure.

On the other hand, FIG. 4 is schematic timing diagram illustrating the operation an embedded controller according to yet another embodiment of the present disclosure. The related description in connection with the embodiment depicted in FIG. 4 may be referred to that in connection with FIG. 2 and FIG. 3. Referring to FIG. 4, in the present embodiment, it is assumed that the embedded controller has 5 tasks waiting for being processed, i.e., Task1~Task5, the timers are Timer1~Timer5, and the tasks Task1~Task5 respectively have different wake-up periods, which are T1, T2, T3, T4 and T5 arranged based on an order from short-period to long-period. Moreover, it is assumed that T2 is twice as long as T1, T3 is three times as long as T1, T4 is five times as long as T1, and T5 is ten times as long as T1. Besides, in the present embodiment, the embedded controller takes a time t to process each task. It should be mentioned that the assumption regarding each time in the above is merely used for the illustration of the present disclosure but constructs no limitations to the present disclosure.

As illustrated in FIG. 4, the control unit of the embedded controller receives the wake-up signals transmitted by the timers Timer1~Timer5 at a time point t0. Thus, the embedded controller transfers to the active mode from the idle mode at the time point t0 and starts to execute the tasks Task1~Task5, respectively. The embedded controller requires taking 5t of time in total to execute tasks Task1~Task5 and then transfers back to the idle mode from the active mode after the tasks Task1~Task5 are completed.

At a time point (t0+T1), only the wake-up signal transmitted by the timer Timer1 is received by the control unit of the embedded controller. Thus, the embedded controller transfers to the active mode from the idle mode at the time point (t0+T1), starts to execute the task Task1 and after taking the time t in executing the task Task1, transfers back to the idle mode from the active mode.

At a time point (t0+T2), the wake-up signals transmitted by the timer Timer1 and the Timer2 are received by the control unit of the embedded controller. Thus, the embedded controller transfers to the active mode from the idle mode at the time point (t0+T2), starts to execute the tasks Task1 and Task2 and after taking 2t of time in executing the tasks Task1 and Task2, then transfers back to the idle mode from the active mode.

At a time point (t0+T3), the wake-up signals transmitted by the timers Timer1 and Timer3 are received by the control unit of the embedded controller. Thus, the embedded controller transfers to the active mode from the idle mode at the time point (t0+T3), starts to execute the tasks Task1 and Task3 and transfers back to the idle mode from the active mode after taking 2t of time in executing the tasks Task1 and Task3.

At a time point (t0+T4), the wake-up signals transmitted by the timers Timer1 and Timer4 are received by the control unit of the embedded controller. Thus, the embedded controller transfer to the active mode from the idle mode at the time point (t0+T4), starts to execute the tasks Task1 and Task4 and after taking 2t of time in executing the tasks Task1 and Task4, then transfers back to the idle mode from the active mode.

At a time point (t0+T5), the wake-up signals transmitted by the timers Timer1, Timer2, Timer4 and Timer5 are received by the control unit of the embedded controller. Thus, the embedded controller transfers to the active mode from the idle mode at the time point (t0+T5), starts to execute the tasks Task1, Task2, Task4 and Task5 and after taking 4t of time in executing the tasks Task1, Task2, Task4 and Task5, then transfers back to the idle mode from the active mode.

Here, even though only a portion of time points are illustrated as examples in the aforementioned exemplary embodiment, the operation principle at the other time points are similar to the above and thus, will not be repeated hereinafter. According to the configuration of the wake-up periods and the description of the embedded controller and the timers, the embedded controller may switch between the active mode and the idle mode by using various timers. That is to say, when any tasks to be executed appear, the embedded controller transfers to the active mode from the idle mode and merely processes the tasks required to be executed when being in the active mode so as to shorten the time for the embedded controller staying in the active mode.

Moreover, it is to be mentioned that the control unit of the embedded controller simultaneously receives the wake-up signals transmitted by the timers Timer1, Timer2, Timer4 and Timer5 at the time point t0+T5, the control unit of the embedded controller sequentially executes the tasks Task1, Task2, Task4 and Task5 after the embedded controller transfers to the active mode and transfers back to the idle mode from the active mode after the tasks Task1, Task2, Task4 and Task5 are all completed. Therein, the present disclosure is not intent to limit the sequence for executing the tasks Task1, Task2, Task4 and Task5.

Figure 1:
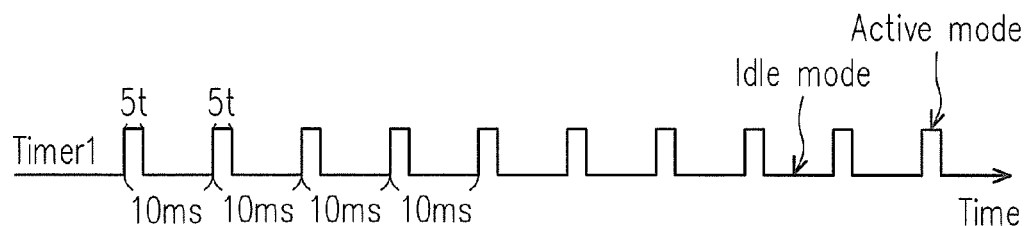
FIG. 1 is a schematic timing diagram illustrating the operation of a conventional embedded controller.

An actually applied scenario will be presented herein, where it is assumed that the power consumption required for the embedded controller staying in the active mode is 20 milliamperes (mA), and the power consumption in the idle mode is 2 mA. It is further assumed that the time t required for processing each task is 0.1 ms. In the embodiment illustrated in FIG. 4, the wake-up periods T1, T2, T3, T4 and T5 are respectively given as 10 ms, 20 ms, 30 ms, 50 ms and 100 ms. In the conventional embedded controller illustrated in FIG. 1, the embedded controller stays in the active mode for 0.5 ms per 10 ms and in the idle mode for 9.5 ms per 10 ms. After 100 ms, the power consumption of the embedded controller is calculated as follows.

$$(20\ mA*5\ ms/100\ ms)+(2\ mA*95\ ms/100\ ms)=2.9\ mA$$

In the embodiment illustrated in FIG. 4, the time for the embedded controller staying in the active mode per 10 ms is inconstant and associated with the number of the tasks to be processed. Thus, after 100 ms, the power consumption of the embedded controller is calculated as follows.

$$(20\ mA*2.6\ ms/100\ ms)+(2\ mA*97.4\ ms/100\ ms)=2.468\ mA$$

Accordingly, by using the more than one timers, the embedded controller may transfer to the active mode only when it has to execute the tasks so as to reduce the power consumption.

Figure 5A:
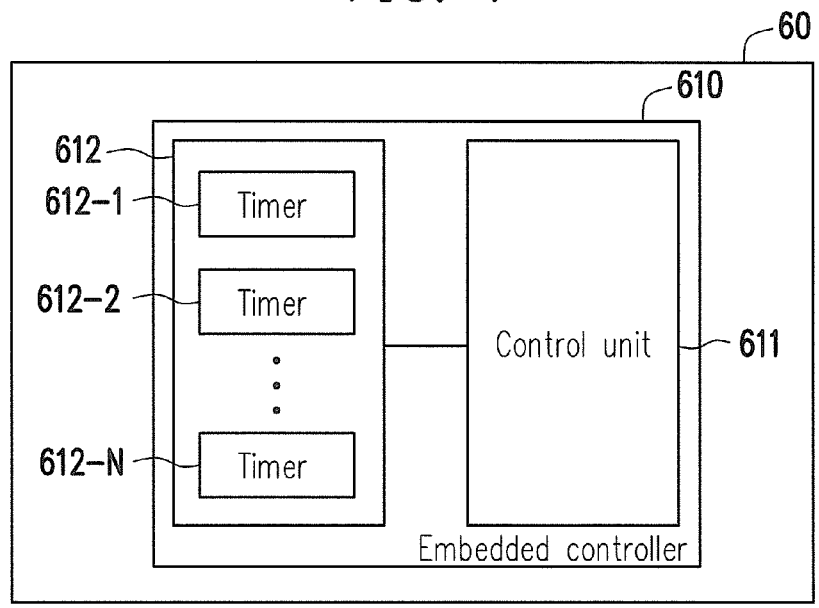
FIG. 5A is a block diagram illustrating a portable electronic device according to an embodiment of the present disclosure.
Figure 5B:
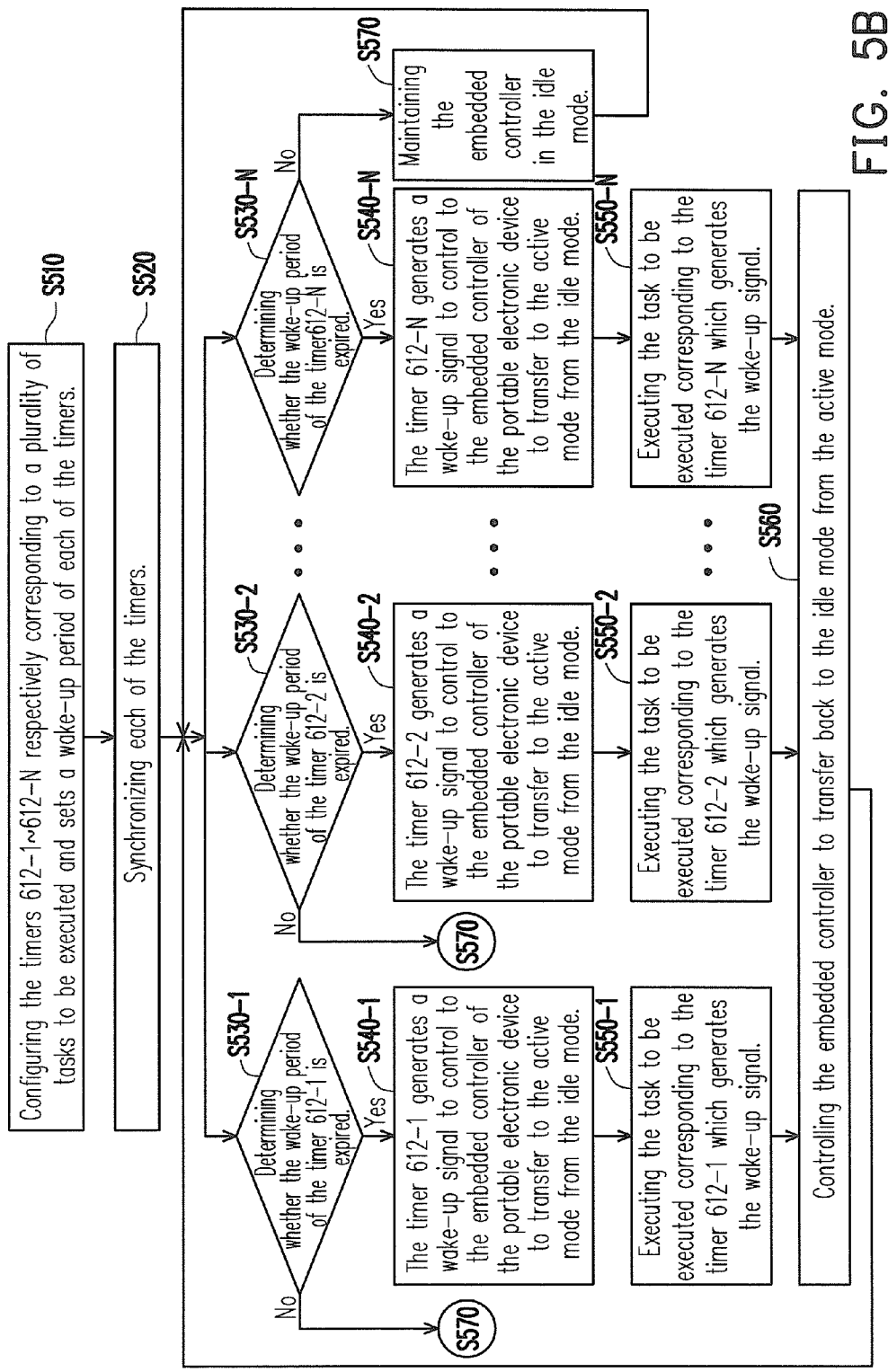
FIG. 5B is a flowchart illustrating a method for power-saving according to another embodiment of the present disclosure.

FIG. 5A is a block diagram illustrating a portable electronic device according to an embodiment of the present disclosure. FIG. 5B is a flowchart illustrating a method for power-saving with respect to the portable electronic device depicted in FIG. 5A. With reference to FIG. 5A and FIG. 5B, in the present embodiment, the method for power-saving is applicable to an embedded controller 610 of a portable electronic device 60. The portable electronic device 60 is, for example, a mobile phone, a personal digital assistant (PDA), a notebook computer or the like. The embedded controller 610 has a timer module 612 and a control unit 611, of which the coupling relationship and functions are identical or similar to those of the timer module 112 and the control unit 111 of the embedded controller 110 in the foregoing embodiment and thus, will not be repeatedly described hereinafter. The timer module 612 includes a plurality of timers 612-1~612-N configured to output wake-up signals to the embedded controller 610 of the portable electronic device. The present disclosure is not intent to limit the number of the timers, and thus, N is a positive integer.

First, in step S510, the portable electronic device 60 configures the timers 612-1~612-N respectively corresponding to a plurality of tasks to be executed and sets a wake-up period of each of the timers 612-1~612-N. Differing from the foregoing embodiment, the wake-up period of each of the timers may be configured by other units (e.g. a unit with a computing function like a processor of the portable electronic device 60) of the portable electronic device 60, and is not limited to being set by an internal element of the embedded controller 610. Then, in the present embodiment, in step S520, the control unit 111 further synchronizes each of the timers 612-1~612-N.

Afterward, in steps S530-1~S530-N, whether the wake-up period of each timer is expired is determined. When the wake-up periods of the timers 612-1~612-N are not expired, the timers 612-1~612-N do not generate wake-up signals. In step S570, the embedded controller 610 of the portable electronic device 60 is maintained in the idle mode. When the wake-up period of each of the timers 612-1~612-N is expired, the corresponding steps S540-1~S540-N follow, where the timers 612-1~612-N respectively generate wake-up signals, and the control unit 111 controls the embedded controller 610 of the portable electronic device 60 to transfer to the active mode from the idle mode according to the wake-up signals. After the embedded controller 610 transfers to the active mode from the idle mode, the corresponding steps S550-1~S550-N follow, where the embedded controller 610 executes the tasks to be executed corresponding to the timers 620-1~620-N which generate the wake-up signals. After the embedded controller 610 completes one or more tasks, in step S560, the control unit 111 controls the embedded controller 610 to transfer back to the idle mode from the active mode.

Based on the above, in the present disclosure, by configuring a plurality of timers, the embedded controller may switch between the active mode and the idle mode to shorten the time for the embedded controller staying in the active mode, such that the power consumption of the embedded controller is therefore reduced to achieve power-saving. In addition, the embedded controller does not take time in the tasks that do not require to be processed, such that the tasks required to be processed may be executed more immediately. Moreover, in the conventional method, the solutions, such as using the embedded controller chip capable of power-saving in replacement or shortening the time for the embedded controller to process each task, are provided to reduce the power consumption of the embedded controller. However, the cost for replacing the chip hardware of the embedded controller is expensive, and shortening the time for processing the tasks may probably result in, for example, incomplete execution of the tasks. The embedded controller of the present disclosure can achieve power-saving without changing any chip hardware thereof so as to avoid the cost for replacing the chip. Moreover, in the present disclosure, the time for executing each task does not have to be shortened, such that the embedded controller may completely and stably execute each task and also achieve the power-saving.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. An embedded controller, applicable to a computer system and configured to execute a plurality of tasks, comprising:
   a timer module, comprising a plurality of timers, each corresponding to one of the tasks; and
   a control unit, coupled to the timer module and setting a wake-up period of each of the timers according to each of the tasks; tasks; and
   a clock generation unit coupled to the timer module, the clock generation unit receiving a first reference clock signal generated by a quartz oscillator and a second reference clock signal simultaneously to generate an operation clock signal, wherein the first reference clock signal and the second reference clock signal are transmitted simultaneously via a low pin count (LPC) bus which connects to the embedded controller and a chipset of the computer system,
   wherein the control unit controls the embedded controller to transfer to an active mode from an idle mode based on each of the received wake-up signals accordingly and controls the embedded controller to transfer back to the idle mode from the active mode after respectively executing the task corresponding to each of the timers which generates the wake-up signal,
   wherein the timers determine whether each of the wake-up period has expired according to the operation clock signal.

2. The embedded controller according to claim 1, wherein when simultaneously receiving a plurality of wake-up signals of the timers to control the embedded controller to transfer to the active mode from the idle mode, the control unit sequentially executes the tasks respectively corresponding to the timers and controls the embedded controller to transfer back to the idle mode from the active mode after the tasks corresponding to the timers which transmit the wake-up signals are all completed.

3. The embedded controller according to claim 1, wherein the control unit respectively sets the wake-up period of each of the timers according to an importance order of each of the tasks.

4. The embedded controller according to claim 1, wherein the embedded controller is further coupled to a plurality of peripheral devices, and the tasks executed by the control unit comprise controlling the peripheral devices or data accessing with the peripheral devices.

5. The embedded controller according to claim 4, wherein the timers respectively correspond to the peripheral devices, and the control unit sets the wake-up period of each of the timers according to a processing order required for each of the peripheral devices.

6. The embedded controller according to claim 1, wherein when the computer system is in the S0i3 power-saving state set up by INTEL, the control unit controls the embedded controller to switch between the idle mode and the active mode according to the wake-up signal of each of the timers.

7. A method for power-saving, applicable to an embedded controller, comprising:
   configuring a plurality of timers respectively corresponding to a plurality of tasks executed by the embedded controller and setting a wake-up period of each of the timers by the embedded controller;
   determining whether each of the wake-up period has expired according to an operation clock signal, wherein the operation clock signal is generated by receiving a first reference clock signal generated by a quartz oscillator and a second reference clock signal simultaneously to generate an operation clock signal, wherein the first reference clock signal and the second reference clock signal are transmitted simultaneously via a low pin count (LPC) bus which connects to the embedded controller and a chipset of the computer system;
   when the wake-up period of each of the timers is expired, respectively generating a wake-up signal by each of the timers;
   when receiving the wake-up signal transmitted by each of the timers, transferring to an active mode from an idle mode;
   respectively executing the tasks corresponding to each of the timers which generates the wake-up signal; and
   transferring back to the idle mode from the active mode when the tasks respectively corresponding to the timers which generate the wake-up signals are all completed.

8. The method for power-saving according to claim 7, wherein the step of respectively executing the tasks corresponding to the timers which generate the wake-up signals when the wake-up signals transmitted by the timers are simultaneously received comprises:
   sequentially executing the tasks respectively corresponding to the timers which generate the wake-up signals.

9. The method for power-saving according to claim 7, wherein the step of respectively setting the wake-up period of each of the timers comprises:
respectively setting the wake-up period of each of the timers according to an importance order of each of the tasks.

10. The method for power-saving according to claim 7, wherein the tasks executed by the embedded controller comprises controlling of a plurality of peripheral devices or data accessing with the peripheral devices.

11. The method for power-saving according to claim 10, wherein the timers respectively correspond to the peripheral devices, and the embedded controller sets the wake-up period of each of the timers according to a processing order required for each of the peripheral devices.

12. The method for power-saving according to claim 7, wherein when the computer system is in the S0i3 power-saving state set up by INTEL, the embedded controller implements the method for power-saving accordingly.

13. A method for power-saving, applicable to a portable electronic device, comprising:
configuring a plurality of timers corresponding to a plurality of tasks to be executed and setting a wake-up period of each of the timers accordingly;
determining whether each of the wake-up period has expired according to an operation clock signal, wherein the operation clock signal is generated by receiving a first reference clock signal generated by a quartz oscillator and a second reference clock signal simultaneously to generate an operation clock signal, wherein the first reference clock signal and the second reference clock signal are transmitted simultaneously via a low pin count (LPC) bus which connects to the embedded controller and a chipset of the computer system;
when the wake-up period of each of the timers is expired, respectively generating a wake-up signal to control an embedded controller of the portable electronic device to transfer to an active mode from an idle mode; and
after the embedded controller executes the tasks to be executed corresponding to the timers which generate the wake-up signals, controlling the embedded controller to transfer back to the idle mode from the active mode.

14. The method for power-saving according to claim 13, wherein the method for power-saving is applicable when the portable electronic device is in the S0i3 power-saving state set up by INTEL.

15. The method for power-saving according to claim 13, wherein the step of setting the wake-up period of each of the timers comprises:
respectively setting the wake-up period of each of the timers according to an importance order of each of the tasks.

16. The method for power-saving according to claim 13, further comprising:
synchronizing each of the timers.

* * * * *